United States Patent [19]

Blasius

[11] Patent Number: 5,290,862

[45] Date of Patent: Mar. 1, 1994

[54] TRANSPARENT HIGH IMPACT ALLOY

[75] Inventor: William G. Blasius, Charlton, Mass.

[73] Assignee: Novacor Chemicals (International) S.A., Fribourg, Switzerland

[21] Appl. No.: 941,036

[22] PCT Filed: Nov. 14, 1991

[86] PCT No.: PCT/US91/08309

§ 371 Date: Oct. 13, 1992

§ 102(e) Date: Oct. 13, 1992

[87] PCT Pub. No.: WO92/13917

PCT Pub. Date: Aug. 20, 1992

Related U.S. Application Data

[63] Continuation-in-part of Ser. No. 654,058, Feb. 12, 1991, abandoned.

[51] Int. Cl.⁵ .................... C08L 53/02; C08L 25/14
[52] U.S. Cl. ........................ 525/89; 525/93; 525/932
[58] Field of Search .................... 525/89, 93

[56] References Cited

U.S. PATENT DOCUMENTS

| | | | |
|---|---|---|---|
| 3,906,057 | 9/1975 | Durst | 260/876 |
| 3,906,058 | 9/1975 | Durst | |
| 3,907,931 | 9/1975 | Durst | |
| 4,737,556 | 4/1988 | Itoh et al. | |

FOREIGN PATENT DOCUMENTS

| | | | |
|---|---|---|---|
| 56-70043 | 6/1981 | Japan | |
| 56-070043 | 6/1981 | Japan | 525/93 |
| 56-100840 | 8/1981 | Japan | |
| 57-21443 | 2/1982 | Japan | |
| 61-43643 | 3/1986 | Japan | |
| 62-091518 | 4/1987 | Japan | 525/93 |
| 62-91518 | 4/1987 | Japan | |
| 630072747 | 4/1988 | Japan | 525/89 |

OTHER PUBLICATIONS

Chemical Abstracts 112(2):8285y, Toyama et al.
Chemical Abstracts 111 (2):8522c, Yamaoka et al.
Chemical Abstracts 109(20):171278v, Yamaoka et al.
Chemical Abstracts 106(12):85901z, Honma et al.
Chemical Abstracts 99(24):196070j, Asahi Chemical Industry Co., Ltd.

*Primary Examiner*—Carman J. Seccuro, Jr.
*Attorney, Agent, or Firm*—Stevens, Davis, Miller & Mosher

[57] ABSTRACT

A tough polymer alloy is provided and comprises:
(i) from 30 to 83 weight percent of a brittle polymer;
(ii) from 3 to 50 weight percent of a rubbery polymer; and
(iii) from 15 to 67 weight percent of a ductile polymer provided that the ductile polymer and the rubbery polymer are at least compatible.

19 Claims, No Drawings

TRANSPARENT HIGH IMPACT ALLOY

TECHNICAL FIELD

The present patent application is continuation-in-part of U.S. Patent application Ser. No. 654,058 filed Feb. 12, 1991, now abandoned. The present invention relates to novel polymer alloys.

BACKGROUND ART

It is known in the art that some physical properties of styrenic or acrylic type polymers may be improved by alloying them with one or more additional polymers. In some cases, the resulting mixture can have improved mechanical properties, such as improved impact strength or toughness.

Chemical Abstracts 109:171278v [Polym. Prepr. (Am. Chem. Soc., Div. Polym. Chem.) 1988, 29(2), 180-1] discloses that physical blends of block SBR (styrene content: 75.2 weight percent) and a copolymer of methyl methacrylate and styrene are partially compatible. The morphological and mechanical properties of the blend are strongly dependent on the molding/mixing process used to produce the blend. The SBR could only be toughened when the ideal morphology of the blend was obtained.

Chemical Abstracts 106:85901z [JP 61/200,151] discloses thermoplastic compositions comprising from 5 to 95 weight percent of a block copolymer and from 95 to 5 weight percent of a thermoplastic polymer (e.g. ABS). The block copolymer is derived from coupling an aromatic vinyl polymer block with an aromatic vinyl monomer-conjugated diene copolymer block. The subject thermoplastic compositions apparently have improved impact strength.

Chemical Abstracts 112:8285y [JP 61/291,610] discloses the use of "impact modifiers" for thermoplastic polymers. The modifiers are basically similar to the block copolymer disclosed by Chemical Abstracts 106:85901z.

Chemical Abstracts 99:196070j [JP 58/122,954] discloses improvement of anisotropy of a styrene hydrocarbon-conjugated diene block copolymer by blending it with a styrene-methacrylic ester copolymer. Such a blend, when extruded to form a molded plate, apparently possesses superior physical properties.

Chemical Abstracts 111:8522c [JP 01/45614] discloses high-impact styrene polymer compositions comprises a major amount of a styrene (50 to 90 weight percent)-conjugated diene (50 to 10 weight percent) block copolymer and a minor amount of a styrene-based polymer (e.g. styrene-methyl methacrylate copolymer).

It would be desirable to have a composition which possesses a combination of improved properties, including improved impact strength. Typically the alloys of the present invention should have a notched Izod impact strength of greater than about 0.5, preferably greater than 1.0 ft.lb./in. In a particularly perferred aspect of the present invention, the alloys may have a haze of less than 10, most preferably less than 5.

DISCLOSURE OF INVENTION

It is an object of the present invention to provide a novel polymer alloy.

Accordingly, in one of its aspects, the present invention provides a polymer alloy comprising:

(i) from 30 to 82 weight percent of a brittle polymer;

(ii) from 3 to 50 weight percent of a rubbery polymer; and (iii) from 15 to 67 weight percent of a ductile polymer provided that the ductile polymer and the rubbery polymer are at least compatible.

BEST MODE FOR CARRYING OUT THE INVENTION

As used in this specification:

"brittle" means a polymer having an elongation at break up to 15%, preferably less than 10%, as measured by ASTM D-638;

"ductile" means a polymer having an elongation at break greater that 15%, as measured by ASTM D-638;

"rubbery" means a natural or synthetic polymer which, at room temperature can be stretched to at least twice its original length, and upon immediate release of the stress, will return to approximate original length;

"compatible" means two or more polymers which have good interfacial adhesion (for example a blend of the polymers exhibits physical properties approximate those expected from the rule of mixtures); and "miscible" means two or more polymers which, when blended, remains clear, especially if the refractive indices of the polymers do not match.

The brittle polymer used in the present polymer alloy may be selected from the group of polymers consisting of polymers comprising:

(i) from 90 to 30, preferably from 80 to 40, most preferably from 75 to 55, weight percent of one or more $C_{8-12}$ vinyl aromatic monomers which are unsubstituted or substituted by a $C_{1-4}$ alkyl radical;

(ii) from 10 to 70, preferably from 20 to 60, most preferably from 25 to 45, weight percent of one or more $C_{1-6}$ alkyl esters of $C_{3-6}$ ethylenically unsaturated carboxylic acids; and (iii) from 0 to 5; preferably from 0 to 3, weight percent of one or more $C_{3-6}$ ethylenically unsaturated carboxylic acids.

The $C_{8-12}$ vinyl aromatic monomer suitable for use in the polymer components of the present polymer alloys is not particularly restricted and may be unsubstituted or substituted by a $C_{1-4}$ alkyl radical. Preferably, the $C_{8-12}$ vinyl aromatic monomer is selected from the group comprising styrene, α-methyl styrene, p-methyl styrene and t-butyl styrene. The preferred $C_8$–$C_{12}$ vinyl aromatic monomer is styrene.

The choice of $C_{1-4}$ alkyl ester of a $C_{3-6}$ ethyenically unsturated carboxylic acid for use in producing the brittle polymer is not particularly restricted. Non-limiting examples of suitable esters include methyl acrylate, ethyl acrylate, methyl methacrylate, ethyl methacrylate, butyl acrylate and butyl methacrylate. The preferred ester is methyl methacrylate.

A brittle styrene acrylate polymer suitable for use in the present polymer alloys is a copolymer of styrene and methyl methacrylate. Preferably, such a copolymer comprises from 75 to 65 weight percent styrene and from 25 to 35 weight percent methyl methacrylate. Such a polymer is commercially available from Novacor Chemicals Inc. under the trademark NAS 30.

The production of a brittle polymer suitable for use in the present polymer alloys is within the purview of a person skilled in the art. Such polymers may be produced by suspension, solution, emulsion or bulk polymerization.

Preferably the brittle polymer is used in an amount from 35 to 75; most preferably from 40 to 70 weight percent of the alloy.

The ductile polymer used in the present polymer alloys may be derived from 60 to 90, preferably from 70 to 80, weight percent of at least one $C_{8-12}$ vinyl aromatic monomer, and 40 to 10, preferably from 30 to 20, weight percent of at least one $C_{4-6}$ conjugated diolefin.

A ductile polymer suitable for use in the present polymer alloys is a linear or radial di-block (vinyl aromatic monomer-conjugated diene) or tri-block (vinyl aromatic monomer-conjugated diene-vinyl aromatic monomer) copolymer. The production of such copolymers is known to those skilled in the art. Such polymers can be produced by living solution polymerization (e.g. using a lithium catalyst). Examples of suitable ductile polymers for use in the present invention are available from Phillips 66 Company and Firestone Synthetic Rubber and Latex Company.

A rubbery polymer suitable for use in the present polymer alloy is derived from 30 to 70, preferably from 40 to 55, weight percent of at least one $C_{8-12}$ vinyl aromatic monomer, and 70 to 30, preferably from 60 to 55, weight percent of at least $C_{4-6}$ conjugated diolefin.

A rubbery polymer suitable for use in the present polymer alloy may be a linear, tapered, or radial di-block (aromatic vinyl monomer-conjugated diene) or a tri-block copolymer (vinyl aromatic monomer-conjugated diene-vinyl aromatic monomer). As is known in the art, a tapered di-block copolymer is a copolymer comprising a block which becomes progressively rich in one of the constituent monomers in a segment (typically, the end) of the block.

The process by which such a tapered copolymer is obtained is similar to the process by which block copolymers are obtained except that there is an incremental adjustment in the monomer feed (e.g. richer or poorer in vinyl aromatic/conjugate diolefin) to produce a block polymer which is "tapered". Examples of suitable rubbery polymers for use in the present polymer alloys are commercially available from Dexco Polymers and Firestone Synthetic Rubber and Latex Company.

Suitable $C_{8-12}$ vinyl aromatic monomers for use in the ductile polymer and the rubbery polymers of the present invention are not particularly restricted and may be unsubstituted or substituted by a $C_{1-4}$ alkyl radical. Preferably, the $C_{8-12}$ vinyl aromatic monomer is selected from the group comprising styrene, α-methyl styrene, p-methyl styrene and t-butyl styrene. A preferred $C_{8-12}$ vinyl aromatic monomer is styrene. Generally, the ductile polymer will contain a larger amount of vinyl aromatic monomer, typically in the range from 70 to 80 weight percent; and the rubbery polymer will contain lower amounts of vinyl aromatic monomer, typically in the range 40 to 50 weight percent.

The $C_{4-6}$ conjugated diolefin suitable for use in the ductile polymer and the rubbery polymer of the present polymer alloys in not particularly restricted and may be unsubstituted or substituted by a chlorine atom. Preferably, the $C_{4-6}$ conjugated diolefin is selected from the group comprising 1,3-butadiene and isoprene.

The rubbery and ductile polymers suitable for use in the present invention should at least be compatible. Preferably, the polymers will be miscible (as defined in the present application).

The polymer alloys of the present invention may comprise from 3 to 50, preferably from 5 to 30, weight percent of the rubbery polymer; from 27 to 67, preferably from 25 to 65 weight percent of the ductile polymer. The brittle polymer may be present in an amount from 30 to 70 weight percent. It should be kept in mind that the ductile and rubbery polymers are at least compatible. At relatively low amounts of brittle polymer, from 30 to 55, preferably from 30 to 45, weight percent, the brittle polymer may form a discontinuous phase distributed within the matrix of rubbery and ductile polymer. At relatively higher amounts of brittle polymer, from 45 to 90, preferably from 55 to 90, weight percent, the ductile and rubbery polymer may form a discontinuous phase distributed throughout the brittle matrix. In the range of from 45 to 55 weight percent of the brittle polymer, the continuous phase is not merely determined by the relative amount of brittle polymer but will also depend on the difference in melt viscosities between the brittle phase and the rubbery and ductile phases.

The rubbery and ductile phases are at least compatible. That is, these components of the alloy will have good interfacial adhesion. Under stress they will not delaminate. Preferably, the rubbery and ductile components are miscible. That is, when blended they will form a clear component, whether or not their refractive indices are matched or close.

In a preferred aspect of the present invention, the refractive index of the brittle polymer is matched to the refractive index of the blend of the ductile and rubbery polymers. If the refractive indices of the brittle polymer and a blend of the ductile and rubbery polymers match to within ±0.01, the alloy will have a low haze, preferably less than 10. If the refractive indices of the brittle polymer and a blend of the rubbery and ductile polymers matches to within ±0.005, then the alloys will have extremely low haze.

In view of the above, the refractive index of the brittle polymer may be selected to try to minimize haze. By blending the ductile and rubbery components in the desired, or required, ratio, the refractive index of the resulting material may be measured if the rubbery and ductile polymers are miscible. Then, the composition of the brittle polymer may be estimated using the formula set forth in the Polymer Handbook, 2nd Ed. John Wiley and Sons Inc. and the refractive indices of the monomers. In this manner, it may be possible to match indices of refraction and obtain extremely clear and tough alloys.

The above is not intended to place any limitation on the order of mixing the polymers. It is not necessary to have a specific sequenced addition of polymers to the extruder.

In the preparing the present polymer alloys, solution blending of the constituents is generally not useful as it is difficult to find a common solvent for each polymer in the blend. Typically, adequate mixing of the components can be achieved by mechanical mixing in a suitable intensive mixer, preferably an extruder. Operation of an extruder to achieve this end is within the purview of a person skilled in the art. For example, for an inch and a half extruder having an L to D ratio of about 24:1, the extruder is operated at from 30 to 150, preferably from 50 to 135, most preferably from 75 to 100, RPM. During such operation, the barrel temperature of the extruder is in the range of from 190° to 240° C., preferably from 200° to 220° C.

In one aspect of the present invention, the ductile and rubbery polymers may be extruded and chopped into pellets. The resulting pellets may then be extruded with the brittle polymer. However, the components of the alloys of the present invention may also be dry blended in, for example, a tumbler blender. The resulting blend may then be extruded. In an alternative procedure, the polymers may be fed directly to an extruder which provides good mixing.

Embodiments of the invention will be illustrated with reference to the following Examples which should not be construed so as to limit the scope of the present invention.

EXAMPLE 1

A number of polymer alloy samples were prepared using the following components:

| COMPONENT | |
|---|---|
| Brittle Polymer | A copolymer derived from styrene (70 weight percent) and methyl methacrylate (30 weight percent), available from Novacor Chemicals Inc. as NAS 30 (trademark). |
| Ductile Polymer | A tri-block copolymer derived from styrene (75 weight percent) and butadiene (25 weight percent). |
| Rubbery Polymer | A tapered polymer derived from styrene (43 weight percent) and butadiene (57 weight percent). |

The components were obtained in the form of pellets and were fed, in the desired amounts, to an extruder. Pre-drying of the resin components was not required. The extruder was operated at 75–100 RPM and a temperature in the range 190°–200° C. The mixture was extruded, chopped into pellets and subsequently injection molded into a number of suitable test specimens for conducting the following physical tests:

| Test | Identification |
|---|---|
| Haze | ASTM D-1003 |
| Notched Izod | ASTM D-256 |
| Tensile Yield | ASTM D-638 |
| Elongation Break | ASTM D-638 |

The amount of each component in the blend and the results of the physical testing are provided in Table 1, wherein all units are in weight percent, unless otherwise indicated.

TABLE 1

| Sample | Ductile Polymer | Rubbery Polymer | Brittle Polymer | Haze (%) | Izod (ft.lb./in.) | Tensile Yield (psi) | Elongation (%) |
|---|---|---|---|---|---|---|---|
| 1 | 45.0 | 15.0 | 40 | 3.7 | 6.5 | 3168 | 199 |
| 2[1] | 37.5 | 12.5 | 50 | 3.6 | 3.7 | 3814 | 150 |
| 3[2] | 37.5 | 12.5 | 50 | 3.8 | 2.8 | 4185 | 136 |
| 4 | 30.0 | 10.0 | 60 | 3.9 | 1.7 | 4936 | 78 |
| 5 | 51.0 | 9.0 | 40 | 9.2 | 4.8 | 3504 | 184 |
| 6 | 42.5 | 7.5 | 50 | 7.0 | 2.2 | 4273 | 105 |
| 7 | 34.0 | 6.0 | 60 | 7.4 | 0.5 | 5607 | 55 |
| 8 | 57.0 | 3.0 | 40 | 17.8 | 1.3 | 4017 | 179 |
| 9 | 47.5 | 2.5 | 50 | 20.1 | 0.5 | 5128 | 66 |
| 10 | 38.0 | 2.0 | 60 | 15.1 | 0.4 | 6206 | 42 |

[1] ductile and rubbery polymer blended and extruded, then blend with brittle polymer.
[2] ductile, rubbery and brittle polymer mixed in a hopper and led to an extruder.

As controls, the haze, Izod impact strength, tensile yield and elongation of the brittle polymer, the ductile polymer and the rubbery polymer are as follows:

| Material | Haze (%) | Izod (ft.lb/in) | Tensile Yield (psi) | Elongation (%) at Break |
|---|---|---|---|---|
| Brittle Polymer | 0.6 | 0.35 | 8300 | 5 |
| Ductile Polymer | 2.0 | 0.75 | 3700 | 160 |
| Rubbery Polymer | — | no break | 1300 | >1000 |

As is evident from Samples 1 through 7, the alloys have a good balance of impact and low haze. These are particularly preferred alloys within the scope of the present invention. Sample 8 has a good toughness and a high haze but is still within the scope of the present invention. Samples 9 and 10 have a high haze and low impact. These alloys all contain less than 3 weight percent of a rubbery polymer and are outside the scope of the present invention.

EXAMPLE 2

Using the same mixing conditions and physical test methods outlined in Example 1, four additional samples were prepared. The amount of each component and the results of the physical testing are provided in Table 2, wherein all units are in weight percent, unless otherwise indicated.

In Table 2, Samples 1 and 3 are within the scope of the invention. In contrast, Samples 2 and 4 are devoid of the second block copolymer and thus, these Samples are outside the scope of the present invention.

TABLE 2

| Sample | Ductile Polymer | Rubbery Polymer | Brittle Polymer | Haze (%) | Izod (ft.lb./in.) | Gardner Impact (in.lb.) | Tensile Yield (psi) | Elongation at Break (%) |
|---|---|---|---|---|---|---|---|---|
| 1 | 18.75 | 6.25 | 75 | 4.6 | 0.5 | 2.0 | 8060 | 11.8 |
| 2 | 25 | 0 | 75 | 2.6 | 0.44 | 0.9 | 8200 | 2.8 |
| 3 | 37.5 | 12.5 | 50 | 4.7 | 5.66 | 160+ | 4026 | 121.3 |
| 4 | 50 | 0 | 50 | 3.5 | 0.5 | 0.9 | 5000 | 30.0 |

As is evident from Table 2, there is a significant increase in the toughness (i.e. Izod and elongation) of Sample 3 when compared to Samples 1, 2 and 4, respectively.

INDUSTRIAL APPLICABILITY

The products of the present invention have an extremely low haze and good impact resistance. In applications where these properties are required, the products of the present invention should be suitable, for example, patio tumblers.

I claim:

1. A polymer alloy consisting of:
   (a) from 70 to 30 weight % of a brittle polymer comprising:
      (i) from 80 to 40 weight % of one or more $C_{8-12}$ vinyl aromatic monomers;
      (ii) from 20 to 60 weight % of one or more $C_{1-4}$ alkyl acrylates or $C_{1-4}$ methacrylates; and
      (iii) from 0 to 3 weight % of one or more $C_{3-6}$ ethylenically unsaturated carboxylic acids;
   (b) from 5 to 30 weight % of a tapered, linear or radial di- or tri- block rubbery polymer comprising:
      (i) from 40 to 45 weight % of one or more $C_{8-12}$ vinyl aromatic monomers; and
      (ii) from 60 to 55 weight % of one or more $C_{4-6}$ conjugated diolefins; and
   (c) from 65 to 25 weight % of a tapered, linear or radial di- or tri-block ductile polymer comprising
      (i) from 70 to 80 weight % of one or more $C_{8-12}$ vinyl aromatic monomers; and
      (ii) from 30 to 20 weight % of one or more $C_{4-6}$ conjugated diolefins.

2. The polymer alloy according to claim 1 wherein said ductile and said rubbery polymers are miscible.

3. The polymer alloy according to claim 2, wherein in said brittle polymer said $C_{8-12}$ vinyl aromatic monomer is selected from the group consisting of styrene, α-methyl styrene, p-methyl styrene and t-butyl styrene.

4. The polymer alloy according to claim 3, wherein in said ductile polymer said $C_{8-12}$ vinyl aromatic monomer is selected from the group consisting of styrene, α-methyl styrene, p-methyl styrene, and t-butyl styrene, and said conjugated diolefin is selected from the group consisting of butadiene and isoprene.

5. The polymer alloy according to claim 4, wherein in said rubbery polymer said one or more $C_{8-12}$ vinyl aromatic monmers is selected from the group consisting of styrene, α-methyl styrene, p-methyl styrene, and t-butyl styrene, and said one or more $C_{4-6}$ conjugated diolefins is selected from the group consisting of butadiene and isoperene.

6. The polymer alloy according to claim 5, wherein said brittle polymer forms a continuous phase and said ductile and said rubbery polymers form one or more discontinuous phases.

7. The polymer according to claim 6, wherein said brittle polymer is present in an amount from 45 to 70 weight percent.

8. The polymer alloy according to claim 7, wherein said brittle polymer is present in an amount from 55 to 70 weight percent and comprises:
   (i) from 55 to 75 weight percent of said one or more $C_{8-12}$ vinyl aromatic monomers;
   (ii) from 45 to 25 weight percent of said one or more $C_{1-4}$ alkyl acrylates or $C_{1-4}$ alkyl methacrylates; and
   (iii) from 0 to 3 weight percent of said one or more $C_{3-6}$ ethylenically unsaturated carboxylic acids.

9. The polymer alloy according to claim 8, said brittle polymer is present in an amount from 55 to 70 weight percent and comprises:
   (i) from 75 to 65 weight percent of styrene;
   (ii) from 25 to 35 weight percent of methyl methacrylate; and
   (iii) from 0 to 3 weight percent of one or more $C_{3-6}$ ethylenically unsaturated carboxylic acids.

10. The polymer alloy according to claim 8, wherein the index of refraction of said brittle polymer matches the index of refraction of a blend of said ductile and said rubbery polymers within ±0.01.

11. The polymer alloy according to claim 9, wherein the index of refraction of said brittle polymer matches the index of refraction of a blend of said ductile and said rubbery polymers within ±0.01.

12. The polymer alloy according to claim 5, wherein said ductile and said rubbery polymers form a continuous phase and said brittle polymer forms a discontinuous phase.

13. The polymer according to claim 12, wherein said brittle polymer is present in an amount from 30 to 55 weight percent.

14. The polymer alloy according to claim 13, wherein said brittle polymer is present in an amount from 30 to 45 weight %.

15. The polymer alloy according to claim 14, wherein said brittle polymer is present in an amount from 30 to 45 weight percent and comprises:
   (i) from 55 to 75 weight percent of said one or more $C_{8-12}$ vinyl aromatic monomers;
   (ii) from 45 to 25 weight percent of said one or more $C_{1-4}$ alkyl acrylates or $C_{1-4}$ alkyl methacrylates; and
   (iii) from 0 to 3 weight percent of said one or more $C_{3-6}$ ethylenically unsaturated carboxylic acids.

16. The polymer alloy according to claim 5, wherein in said polymer alloy said brittle polymer is present in an amount from 30 to 45 weight percent and comprises:
   (i) from 75 to 65 weight percent of styrene;
   (ii) from 25 to 35 weight percent of methyl methacrylate; and
   (iii) from 0 to 3 weight percent of one or more $C_{3-6}$ ethylenically unsaturated carboxylic acids.

17. The polymer alloy according to claim 15, wherein the index of refraction of said brittle polymer matches the index of refraction of a blend of said ductile and said rubbery polymers within ±0.01.

18. The polymer alloy according to claim 15, wherein the index of refraction of said brittle polymer matches the index of refraction of a blend of said ductile and said rubbery polymers within ±0.01.

19. The polymer alloy according to claim 16, wherein the index of refraction of said brittle polymer matches the index of refraction of a blend of said ductile and said rubbery polymers within ±0.01.

* * * * *